United States Patent [19]

Nihei

[11] Patent Number: 4,611,246

[45] Date of Patent: Sep. 9, 1986

[54] HANDY READER/PRINTER APPARATUS

[75] Inventor: Kazuhiro Nihei, Tokyo, Japan

[73] Assignee: Casio Computer Co., Ltd., Tokyo, Japan

[21] Appl. No.: 789,617

[22] Filed: Oct. 21, 1985

[30] Foreign Application Priority Data

Nov. 14, 1984 [JP] Japan .............................. 59-240352

[51] Int. Cl.$^4$ ............................................. H04N 1/00
[52] U.S. Cl. .................................... 358/256; 358/293; 358/294; 346/76 PH; 346/143
[58] Field of Search .............. 358/256, 286, 293, 294; 346/76 PH, 143, 165; 250/578

[56] References Cited

U.S. PATENT DOCUMENTS

| | | | |
|---|---|---|---|
| 3,541,248 | 11/1970 | Young .................................. | 358/294 |
| 3,739,095 | 6/1973 | Alden .................................. | 358/294 |
| 3,973,111 | 8/1976 | Washizuka et al. ................. | 346/143 |
| 3,993,865 | 11/1976 | Browne et al. ...................... | 358/285 |
| 4,211,012 | 7/1980 | Alles et al. .......................... | 346/143 |
| 4,319,283 | 3/1982 | Ozawa et al. ....................... | 358/293 |
| 4,438,459 | 3/1984 | Levine ................................. | 358/286 |
| 4,523,235 | 6/1985 | Rajchman ........................... | 358/293 |
| 4,553,035 | 11/1985 | Malinsky et al. ................... | 358/293 |

Primary Examiner—James J. Groody
Assistant Examiner—Edward L. Coles
Attorney, Agent, or Firm—Frishauf & Partners

[57] ABSTRACT

In a handy reader/printer apparatus for reading recorded information from a desired portion of a medium to be read and printing read information on a desired portion of a medium to be printed, the apparatus has a housing having an opening in a lower surface thereof and placed on the medium to be read or printed such that the desired portion of the medium can be fitted in the opening, a reader unit, arranged in the housing, for reading the recorded information of the desired portion of the medium to be read fitted in the opening while the housing is placed on the medium, a printer unit, arranged in the housing, for printing data in the desired portion of the medium to be printed fitted in the opening while the housing is placed on the medium, a memory for storing data read by the reader unit upon operation of the reader unit, and a readout unit for reading out the storage data from the memory as the printing data to the printer unit upon operation of the printer unit.

13 Claims, 23 Drawing Figures

F I G. 2
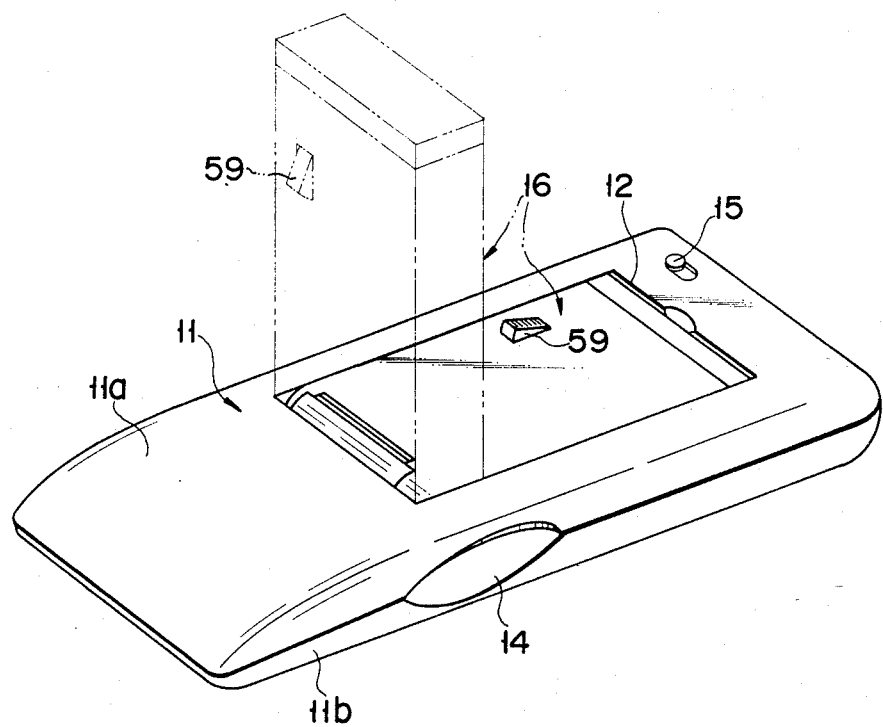

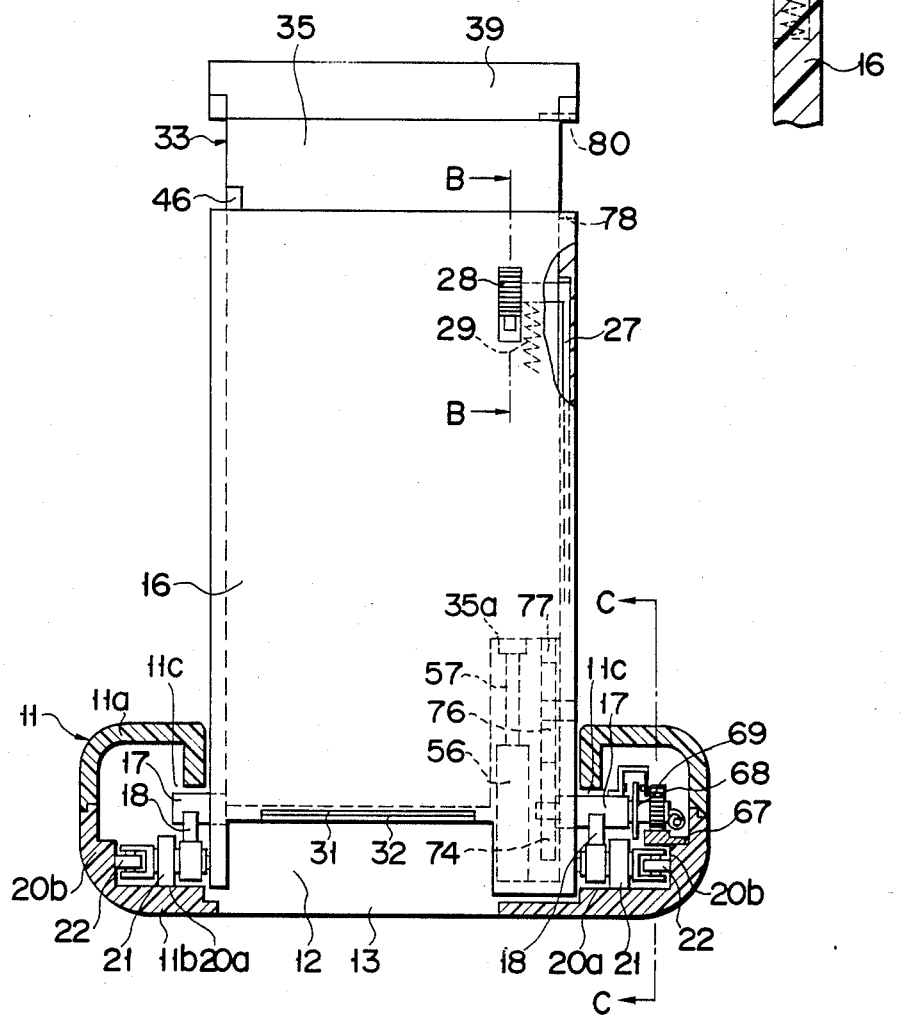

FIG. 15
FIG. 16
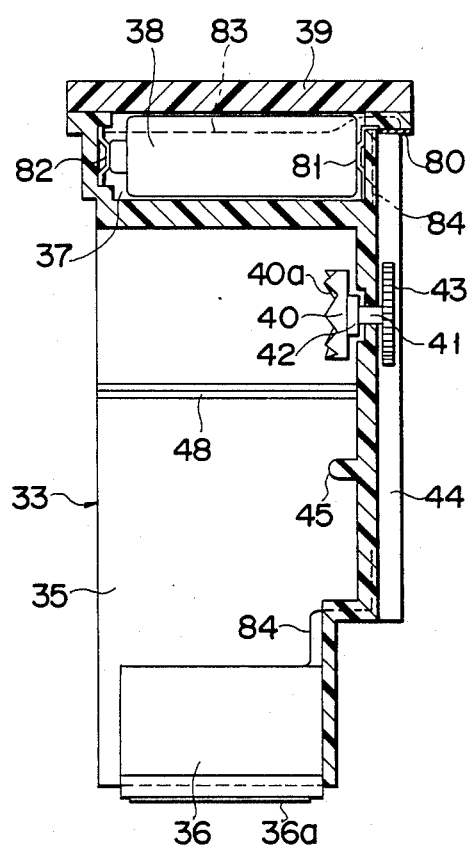
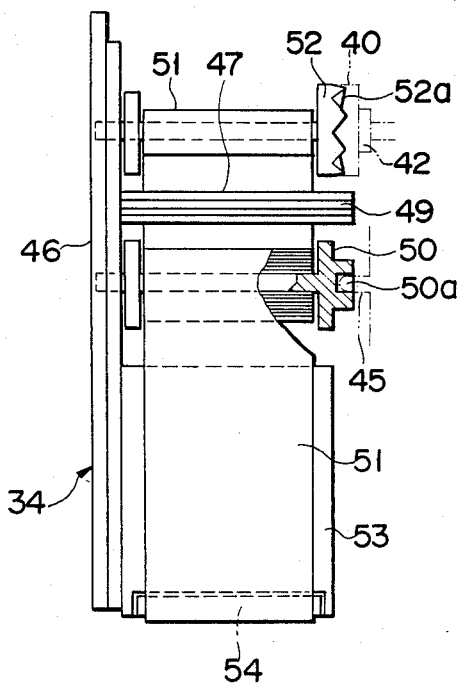

HANDY READER/PRINTER APPARATUS

BACKGROUND OF THE INVENTION

This invention relates to a handy reader/printer apparatus and, more particularly, to a handy reader/printer apparatus for reading recorded information of a desired portion in a document and printing the read information in a desired portion on paper.

A conventional reader/printer apparatus having both reader and printer functions comprises a platen and a carrier moved adjacent to the platen along its longitudinal direction. The carrier has a reader unit and a printer unit.

Since the conventional reader/printer apparatus of this type uses the platen, however, the overall system is large and is not handy. In the conventional reader/printer apparatus, a document to be read and paper to be printed with the information are both wound around the platen. Therefore, information cannot be read from a three-dimensional object such as a book, or the read information cannot be printed on a three-dimensional object such as a notebook.

Another conventional reader/printer apparatus of this type is a portable copying machine. The portable copying machine can only copy information on sheets present therein. A copying image cannot be formed on a desired medium at desired locations outside the machine as needed.

SUMMARY OF THE INVENTION

It is, therefore, an object of the present invention to provide a new and improved handy reader/printer apparatus in which a compact, portable structure provides high flexibility and information can be read from a three-dimensional object such as a book and the read information can be printed on a three-dimensional object such as a notebook.

According to the present invention, there is provided a handy reader/printer apparatus for reading information from a desired portion of a medium to be read and printing the read information in a desired portion of a medium to be printed, the apparatus comprising:

a housing having an opening in a lower surface thereof and placed on the to be read or printed medium such that the desired portion of the medium can be fitted in the opening;

a reader unit, arranged in the housing, for reading the recorded information of the desired portion of the reading medium fitted in the opening while the housing is placed on the reading medium;

a printer unit, arranged in the housing, for printing data in the desired portion of the medium to be printed fitted in the opening while the housing is placed on the medium to be printed;

a memory for storing data read by the reader unit upon operation of the reader unit; and a readout unit for reading out the storage data from the memory and supplying it as the printing data to the printer unit upon operation of the printer unit.

BRIEF DESCRIPTION OF THE DRAWINGS

These and other objects and features of the present invention can be understood by reference to the accompanying drawings, in which:

FIG. 2 is a perspective view showing the outer appearance of the apparatus of FIG. 1;

FIG. 3 is a sectional view of the apparatus taken along the line A—A of FIG. 1;

FIG. 4 is an enlarged sectional view of the apparatus taken along the line B—B of FIG. 3;

FIG. 15 is a longitudinal front view of the printer housing shown in FIG. 14;

FIG. 16 is a longitudinal front view of the ink tape cassette shown in FIG. 14;

DETAILED DESCRIPTION OF THE PREFERRED EMBODIMENT

A reader/printer apparatus according to an embodiment of the present invention will be described with reference to the accompanying drawings.

A handy reader/printer apparatus has an outer appearance shown in FIG. 2 and the following arrangement.

Figure 1:
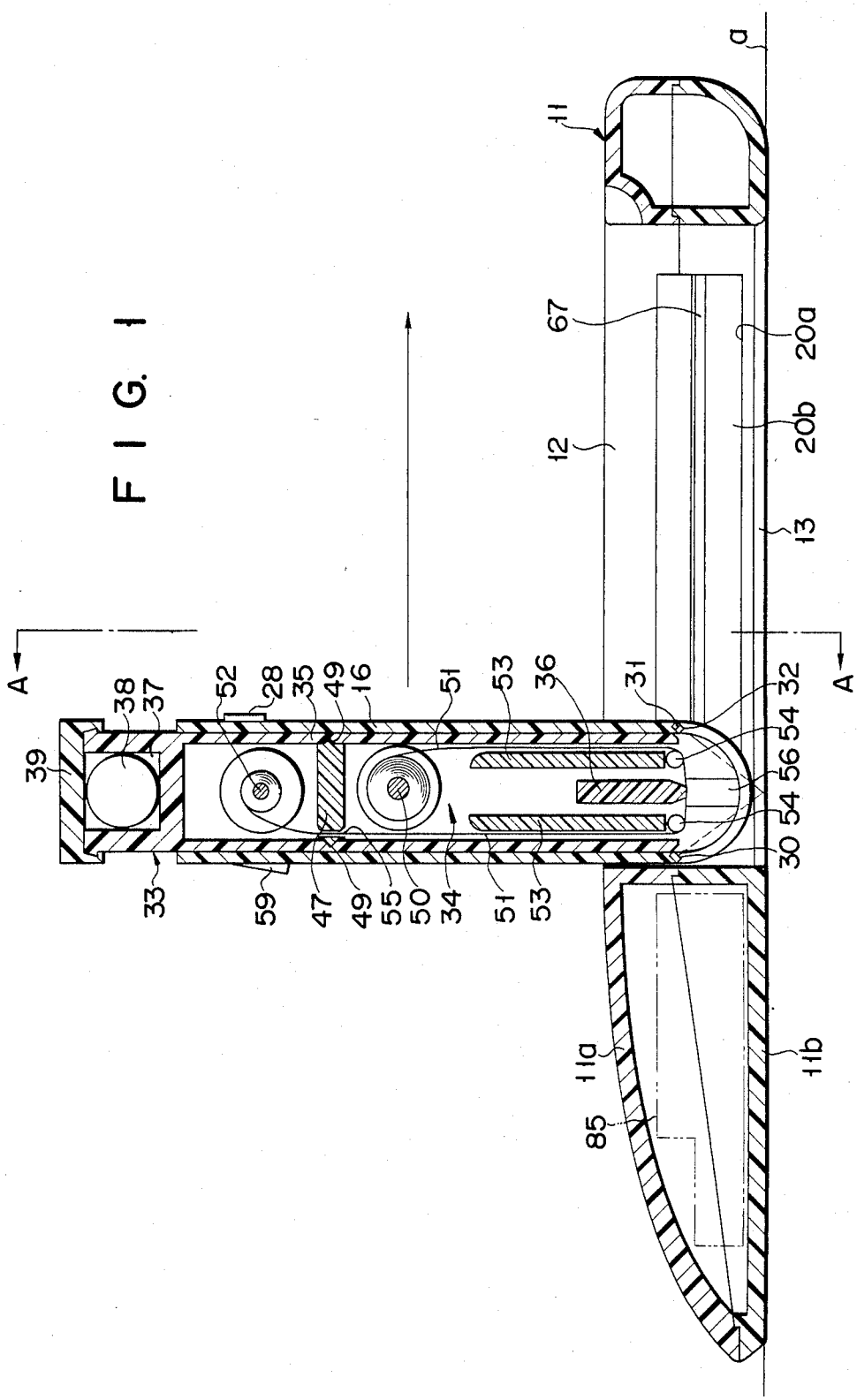
FIG. 1 is a longitudinal sectional view of a handy reader/printer apparatus according to an embodiment of the present invention.

Referring to FIGS. 1 to 3, reference numeral 11 denotes a flat box-like apparatus housing constituted by upper and lower cases 11a AND 11b. A rectangular elongated space 12 open to the upper surface of the housing is formed at the center of the housing 11. The housing 11 has a compact size: a length of about 17 to 20 cm; a width of about 8 to 10 cm; and a thickness of about 3 cm. The user can carry the housing 11 in one hand. The space 12 has an area of about 10 cm×5 cm.

Reference numeral 13 denotes a reading/printing opening formed in the lower surface of the housing 11. The opening 13 has the same length as that of the space 12 and a width slightly smaller than that thereof. More specifically, the opening 13 has a size (about 10 cm×about 4 cm).

The housing 11 is placed on a medium to be read (e.g., a book, a newspaper or other printed matter) during reading. However, during printing, the housing 11 is placed on a medium to be printed (e.g., a notebook or other recording paper). Recesses 14 are formed at two longitudinal sides of the housing 11, as shown in FIG. 2, so that the user can firmly hold the housing 11 at the recesses 14. Referring to FIG. 2, reference numeral 15 denotes a power switch arranged on the upper surface of the housing 11.

Reference numeral 16 denotes a carrier case which can be pivotally fitted in the space 12 and can stand up on the housing 11. The case 16 incorporates a 4-cm wide reader unit for reading recorded information on the reading medium and a 4-cm wide printer unit for printing read information on the printing medium.

When the reader/printer apparatus is not used, the case 16 is fitted in the space 12 of the housing 12, as indicated by the solid lines of FIG. 2, so that the upper surface of the case 16 has substantially the same level as that of the upper surface of the housing 11. However, when the reader/printer apparatus is used, the case 16 stands up vertically as indicated by the alternate long and two short dashed lines of FIG. 2. In the standing state, the case 16 can be manually moved along the longitudinal direction of the space 12.

The arrangement of the case 16 will be described. The case 16 has a rectangular member which has two open ends. The case 16 is pivoted at a proximal portion thereof and is supported by the housing 11 such that the standing case 16 can be moved along the longitudinal direction of the space 12.

Referring to FIG. 3, reference numerals 17 denote horizontal shafts mounted at the two ends of the proximal portion of the case 16. The shafts 17 are inserted in elongated openings 11c extending along substantially the entire length of the space 12, respectively.

Figure 5:
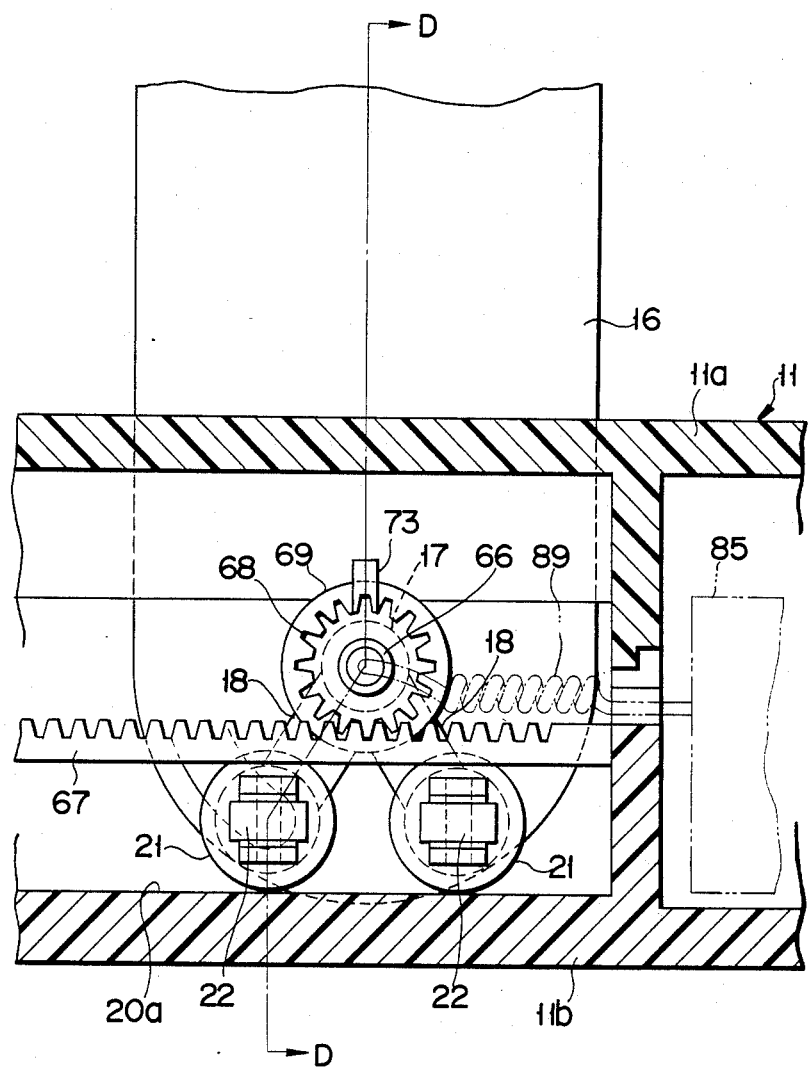
FIG. 5 is an enlarged sectional view of the apparatus taken along the line C—C of FIG. 3.
Figure 6:
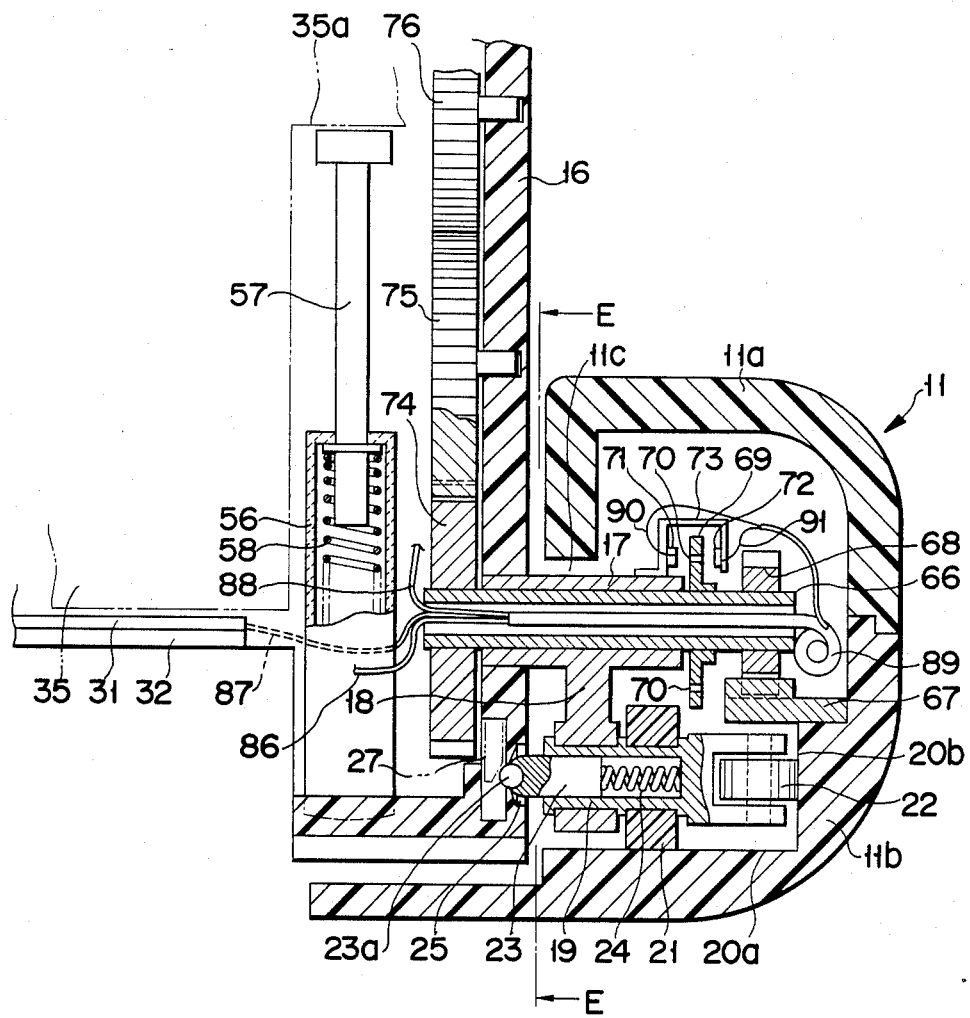
FIG. 6 is a sectional view of the apparatus taken along the line D—D of FIG. 5.

Front and rear pairs of arms 18 are respectively fixed on the shafts 17 to extend downward toward two sides, as shown in FIGS. 5 and 6. Horizontal shafts 19 are fixed at the distal ends of the arms 18, respectively. Vertical rollers 21 are rotatably mounted on the shafts 19 and are in rolling contact with horizontal rail surfaces 20a formed on the inner bottom surfaces of the lower case 11b of the housing 11, respectively. The shafts 17 are supported without being rotated and kept balanced by the rollers 21 which are in rolling contact with the surfaces 20a of the housing 11.

The case 16 is pivotally supported by the shafts 17. The case 16 can be pivoted about the shafts 17 to stand up. At the same time, the case 16 can be moved in the standing state along the longitudinal direction of the space 12 while the rollers 21 are guided along the surfaces 20a.

Horizontal rollers 22 are mounted at the distal ends of the shafts 19 and are in rolling contact with vertical rail surfaces 20b formed extending vertically from the surfaces 20a in the lower case 11b of the housing 11, respectively. Horizontal movement of the case 16 is prevented by the rollers 22.

One of the shafts 19 for supporting each shaft 17 of the case 16 through the arms 18 comprises a hollow shaft, as shown in FIG. 6. A lock pin 23 is slidably inserted in the hollow shaft 19, so that the case 16 is locked in the standing state.

A ball 23a is supported at the distal end of the pin 23 and is in rolling contact with the side surface of the carrier case 16. The pin 23 is pressed by a coil spring 24 arranged in the hollow shaft 19 against the side surface of the case 16.

Figure 7:
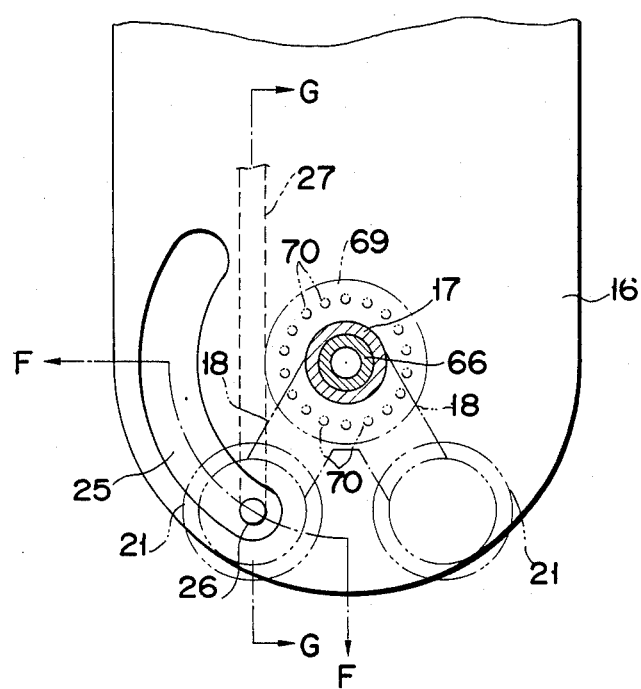
FIG. 7 is a sectional view of the apparatus taken along the line E—E of FIG. 6.
Figure 9:
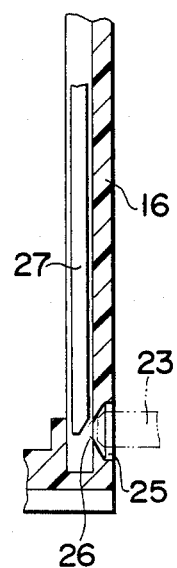
FIG. 9 is a sectional view of the apparatus taken along the line G—G of FIG. 7.
Figure 8:
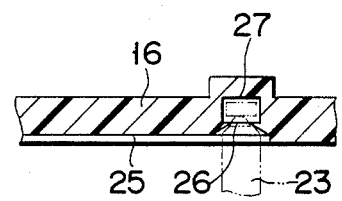
FIG. 8 is a sectional view of the apparatus taken along the line F—F of FIG. 7.

A side surface portion of the case 16 which is in contact with the pin 23 through the ball 23a has an arcuated recess 25, as shown in FIGS. 7 and 8. A lock pin hole 26 is formed in one end portion (a portion corresponding to the pin 23 in the standing state of the case 16) of the recess 25. The ball 23a is thus fitted in the hole 26. A wall surface defining the hole 26 is constituted by a surface tapered toward the center of the hole 26.

The pin 23 is in contact with the recess 25 through the ball 23a when the case 16 is fitted in the space 12 of the housing 11. The ball 23a is gradually moved within the recess 25 while the case 16 is gradually raised. When the case 16 completely stands up, the ball 23a is fitted in the hole 26, thereby locking the case 16.

Reference numeral 27 denotes a lock release member for releasing the pin 23 when the case 16 is fitted in the space 12 of the housing 11. The member 27 is vertically moved along the inner side surface of the case 16. The upper end of the member 27 is coupled to a lock release knob 28 which is vertically slidable and arranged at the upper end portion of the front surface (i.e., the surface facing down when the case 16 is fitted in the space 12), as shown in FIGS. 3 and 4. The member 27 and the knob 28 are pressed upward by a coil spring 29.

The member 27 is moved downward upon depression of the knob 28. When the member 27 is moved downward, the ball 23a at the distal end of the lock pin is removed by the distal end of the member 27 and is disengaged from the hole 26. As a result, when the case 16 is pushed to lay down while the knob 28 is slid downward, the case 16 can be fitted in the space 12.

Figure 10:
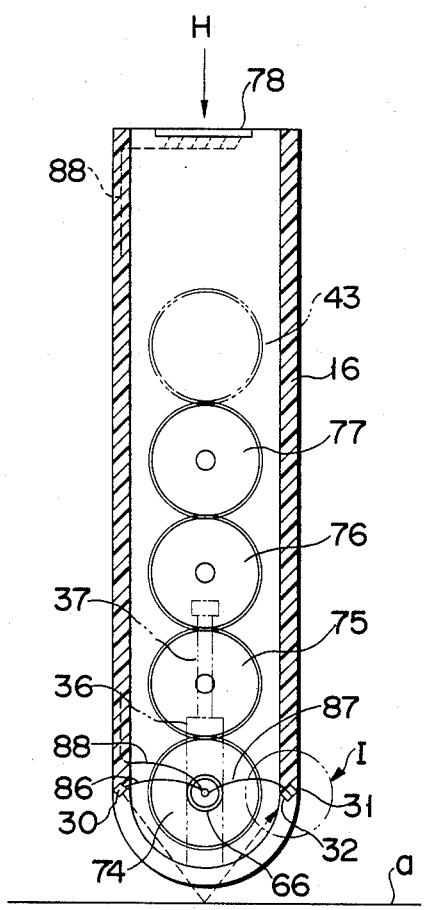
FIG. 10 is a longitudinal sectional view of a carrier case of FIG. 2.

A line illumination element 30 (e.g., a light-emitting diode or a slit lamp) is arranged at the edge of the rear plate of the case 16 extending substantially across the entire width of the edge to emit linear beams toward a reading surface a of the medium to be read, as shown in FIG. 10. A line image sensor 31 is arranged at the lower edge of the front plate of the case 16 extending substantially across the entire width of the edge so as to detect the reflected image (of the surface a) as density information of light from element 30 reflected by the medium to be read a.

Figure 12:
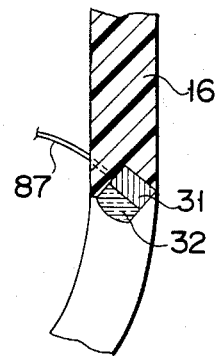
FIG. 12 is an enlarged view of an I portion shown in FIG. 10.

The element 30 and the sensor 31 constitute a reader unit for detecting the recorded information of the medium and supplying it to a controller (described later). When the case 16 stands vertically and its lower surface is brought into contact with the surface a, the element 30 is inclined to emit light toward an intermediate position between the element 30 and the sensor 31. The sensor 31 is also inclined so as to receive the light reflected from surface a. The sensor 31 comprises, for example, a line image sensor of 256 bits/line. A focusing lens 32 comprising a SELFOC lens array is arranged on the front surface of the image sensor, as shown in FIG. 12.

The printer unit arranged in the case 16 will be described hereinafter. The printer unit is of a thermal transfer type, and has a modular arrangement housed in the case 16.

Figure 13:
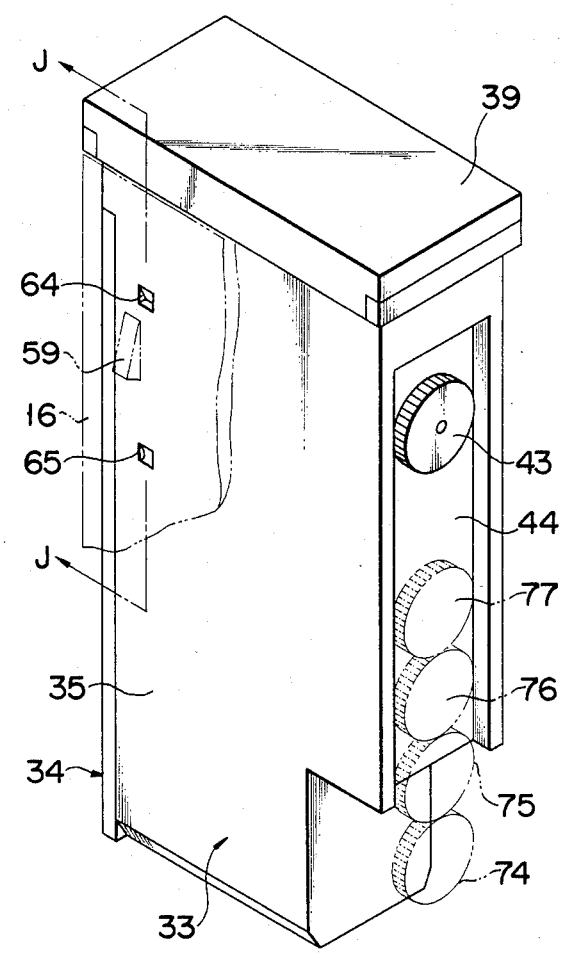
FIG. 13 is a perspective view of a printer unit inserted in the carrier case shown in FIG. 2.

FIG. 13 shows the outer appearance of the printer unit. The printer unit comprises a printer housing 33 vertically slidable and upwardly detachable in the case 16, and an ink tape cassette 34 loaded in the housing 33.

Figure 14:
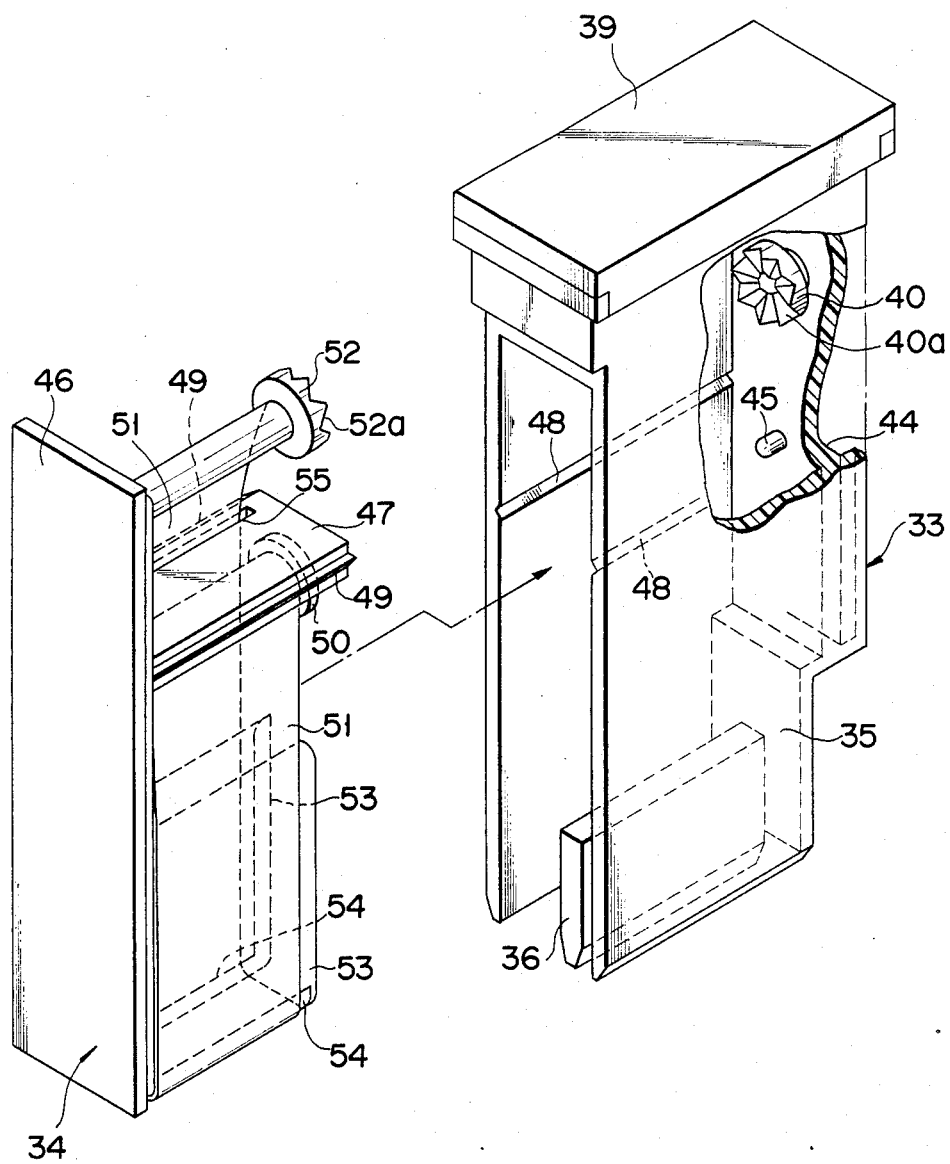
FIG. 14 is a perspective view of a printer housing and an ink tape cassette which constitute a printer unit of FIG. 13.

As shown in FIGS. 14 and 15, in the housing 33, a line thermal printhead 36 with a driver (not shown) is vertically arranged in the lower end portion of a printer case 35 having lower and one side surfaces which are open. The head 36 is located substantially at the center between the front and rear surfaces of the case 35. One side surface of the printhead 36 is fixed on the inner side surface of the case 35. The printhead 36 has thin-film heating elements 36a (five elements/mm) constituting a selective point heater at the lower end face.

A housing 37 for a dry battery 38 is formed at the upper end portion of the case 35. The upper surface of the housing 37 can be opened. The housing 37 is covered with a cover 39 which is detachably mounted on the upper end portion of the case 35.

An ink tape take-up gear 40 with radial teeth 40a is arranged below the housing 37 and inside the printer case 35. The gear 40 is mounted through a one-way clutch 42 on a horizontal rotating shaft 41 extending through a side plate of the case 35. A driven gear 43 is mounted on a portion of the shaft 41 extending outside the case 35 to receive the driving force from other gears (to be described later). The gear 43 is housed in a vertical groove 44 formed in the outer surface of the case 35 which has an open lower end, so that the gear 43 will not extend outside the outer surface of the case 35.

A tape reel shaft 45 fitted with the tape reel end of the cassette 34 (to be described in detail later) extends horizontally outside from the case 35 below the gear 40.

The cassette 34 has the following structure.

Referring to FIGS. 14 and 16, reference numeral 46 denotes a side plate fitted against the open side surface of the case 35. A partition plate 47 is horizontally disposed in the case 35 between the gear 40 and the shaft 45. Guides 49 slidably engaged with guide grooves 48 horizontally formed in the front and rear inner surfaces of the printer case 35 at the two edges of the plate 47.

A cantilevered tape reel 50 is horizontally provided below the plate 47 such that one end of the reel 50 is rotatably supported by the plate 46. A wide heat transfer ink tape 51 is wound around the reel 50. The reel 50 is arranged in correspondence with the shaft 45 at the printer case 35 side. A bearing hole 50a rotatably fitted with the shaft 45 is formed at the other end of the reel 50.

A cantilevered tape take-up reel 52 is horizontally provided above the plate 47 such that one end of the reel 52 is supported by the plate 46. The reel 52 is disposed in correspondence with the gear 40 at the case 35 side. Radial teeth 52a are formed at the other end of the reel 52 to mesh with the teeth 40a of the gear 40.

A pair of tape guide plates 53 are disposed below the reel 50 and inserted at two sides of the head 36 in the case 35. The guide plates 53 are integrally formed with the side plate 46. Tape guide rollers 54 are each arranged at lower ends of the plates 53.

An ink tape 51 supplied from the reel 50 is looped around the plates 53 and the reel 52 through a slit 55 formed in the plate 47.

The projections 49 of the cassette 34 are guided by the grooves 48 in the case 35 so that the cassette 34 is inserted from the open side surface thereof and loaded in the housing 33. The printer unit having the housing 33 loaded with the cassette 34 is inserted from the upper end of the case 16 and is set therein.

The cassette 34 is disposable and can be replaced with a new one when the tape 51 is used up. The cassette 34 can be replaced in the following manner. The housing 33 is removed from the case 16, the cassette 34 is removed from the housing 33, and a new ink tape cassette is inserted in the housing 33.

The printer unit inserted in the case 16 is supported by a printer unit support mechanism in the case 16 such that the lower end of the case 35 is at substantially the same level as that of the reader unit (i.e., the element 30 and the sensor 31) in the case 16 (FIG. 1).

As shown in FIG. 6, the printer unit support mechanism comprises a cylinder 56 extending from the lower end of the case 16, a printer unit support rod 57 inserted in the cylinder 56 so as to be vertically movable while the upper end thereof extends above the cylinder 56, and a coil spring 58 arranged in the cylinder 56 to push the rod 57 upward. The upper end of the rod 57 abuts against the lower surface of a step 35a formed on the case 35, thereby supporting the printer unit.

The printer unit support mechanism supports the printer unit by means of a spring force. In this case, the printer unit is supported so as not to block the optical path from the element 30 to the surface a and the optical path from the surface a to the sensor 31 during reading. During printing, the printer unit is held in the printing position by a printer unit lock mechanism while the printhead 36 is manually moved downward to the position where its lower surface is in contact with the surface a.

Figure 17:
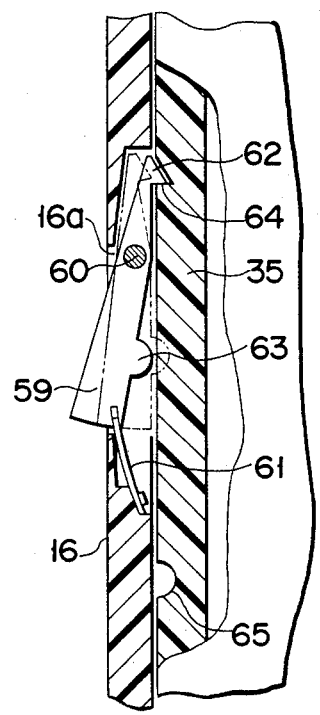
FIGS. 17 and 18 are respectively enlarged sectional views of the printer unit taken along the line J—J of FIG. 13.
Figure 18:
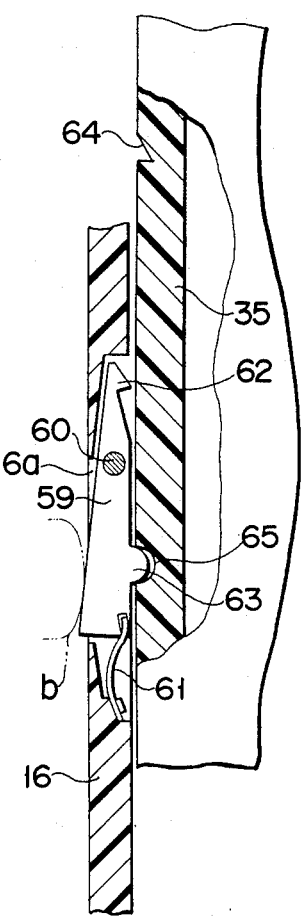

FIGS. 17 and 18 show the structure of the printer unit lock mechanism. Reference numeral 59 denotes a push lever mounted at the upper end portion of the rear surface (i.e., the upper surface when the case 16 is fitted in the space 12 of the housing 11) of the case 16. The lever 59 is arranged within an opening 16a formed in the rear plate of the case 16. A portion slightly above the intermediate portion of the lever 59 is pivotally supported by a shaft 60 and its lower end is biased by a leaf spring 61 to extend outside from the outer surface of the case 16. One end of the spring 61 is fixed to the inner surface of the rear plate of the case 16.

A hook 62 and a semicircular projection 63 are formed at the upper and lower ends of the side of the lever 59 which is opposite to the case 35. The hook 62 extends into the case 16 and pressed against the case 35 while the lower end of the lever 59 extends outside the outer surface of the case 16. When the user pushes the lower end portion of the lever 59 by a finger b, the lever 59 is pivoted to remove the hook 62 from the case 35. When the lower end portion of the lever 59 extends outside the outer surface of the case 16, the projection 63 is removed from the case 35. When the user's finger b pushes the lever 59, the projection 63 is pressed against the outer surface of the case 35.

A locking recess 64 and a semicircular recess 65 are formed in the outer surface of the case 35 and can be respectively engaged with the hook 62 and the projection 63 of the lever 59.

The recess 64 is formed at the position corresponding to the hook 62 of the lever 59 when the printer unit is held in the printing state, i.e., when the printhead 36 is moved downward and brought into contact with the printing surface through the ink tape 51. More particularly, when the printer unit is gradually moved downward from the state of FIG. 18, the hook 62 pressed by the spring 61 against the surface of the case 35 is fitted in the recess 64, as shown in FIG. 17, thereby locking the printer unit.

When the printer unit is moved upward such that the lower end of the printer case 35 is at the same level as that of the reader unit during reading, the recess 65 is opposite to the projection 63 of the lever 59.

When the printer unit is moved downward to the printing position, the lever 59 is pivoted, and the hook 62 is released from the recess 64, as indicated by the alternate long and two short dashed lines of FIG. 17. The printer unit is then automatically moved upward by the printer unit support mechanism. The rod 57 of the printer unit support mechanism is moved to the upper limit and the lower end of the case 35 comes to a position at the same level as the reader unit. In this state, the recess 65 is at the same level as that of the projection 63 of the lever 59, and engages therewith, as shown in FIG. 18. Since the printer unit is supported by the printer unit support mechanism in this state, the printer unit will not be moved downward even if the user's finger b is released from the lever 59 or the projection 63 is disengaged from the recess 65. However, when the printer unit is erroneously moved downward during reading, the optical path from the element 30 to the sensor 31 is shielded by the case 35, and reading is interrupted. For this reason, in this embodiment, the push lever 59 is continuously depressed by the finger b during reading (to be described in detail later), so that the projection 63 of the lever 59 is fitted in the recess 65, thereby locking the printer unit.

Each of the shafts 17 at the two sides of the case 16 comprises a hollow cylinder. A hollow rotating shaft 66 comprising a pipe is rotatably supported in the hollow shaft 17, as shown in FIGS. 5 and 6.

A portion of the shaft 66 extending outside the shaft 17 has a pinion gear 68 meshed with a rack 67 extending in the housing 11 along its longitudinal direction, and a rotary disk 69 spaced by a predetermined distance therefrom.

The gear 68 is driven by the rack 67 upon movement of the case 16. The shaft 66 is rotated together with the disk 69 upon rotation of the gear 68.

The disk 69 has a large number of apertures 70 at a predetermined pitch (FIG. 7) at its outer periphery. A light-emitting element 71 comprising a light-emitting diode, and a phototransducer element 72 such as a phototransistor are mounted at two sides of a channel support plate 73 so as to sandwich the disk 69. The proximal end of the plate 73 is fixed on the shaft 17.

The disk 69 and the elements 71 and 72 constitute a rotary encoder for generating timing pulses synchronized with the moving speed of the case 16 along the longitudinal direction of the housing 11 (to be described in detail later). Every time the apertures 70 cross the optical path between the elements 71 and 72 upon rotation of the disk 69, light from the element 71 is emitted through the corresponding apertures 70 and is received by the element 72, so that the element 72 generates a corresponding pulse signal.

The other end of the shaft 66 slightly extends inside the case 16. A drive gear 74 for giving an ink tape take-up force to the printer unit is mounted on the extended portion of the shaft 66.

As shown in FIGS. 6 and 10, a plurality of power transmission gears (e.g., three gears 75, 76 and 77 in this embodiment) are vertically aligned and meshed with each other on the inner side surface of the case 16. The lowermost gear 75 is meshed with the drive gear 74. The gears 74, 75, 76 and 77 have the same diameter as that of the driven gear 43 in the printer unit. These gears are arranged to be fitted in the groove 44 (FIG. 13) formed in the outer surface of the printer case 35 when the printer unit is inserted in the case 16.

The uppermost gear 77 is meshed with the gear 43 in the printer unit when the printer unit is moved downward to the printing position, as shown in FIG. 10. In this state, when the case 16 is moved from the position of FIG. 1 in the direction indicated by the arrow, the gear 43 in the printer unit is rotated through the power transmission gears, so that the reel 52 is driven in the take-up direction through the gear 40.

The one-way clutch 42 inserted between the gears 43 and 44 is arranged to transmit only the take-up driving force to the reel 52. When the case 16 is returned to the initial position, the gear 43 is rotated through the power transmission gears, and the gear 40 will not be rotated. Therefore, the reel 52 will not rotate when the case 16 is returned to the initial position.

Figure 11:
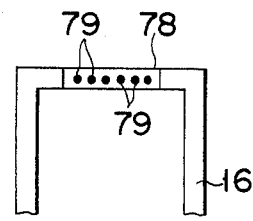
FIG. 11 is a plan view of an H portion shown in FIG. 10.

As shown in FIGS. 10 and 11, a terminal plate 78 is mounted on the upper end face of the case 16. A prescribed number of printer unit connecting terminals 79 are formed on the upper surface of the plate 78.

A terminal plate 80 is mounted on the lower surface of a collar opposite to the upper surface of the case 16 in the upper end portion of the printer case 35 of the printer unit, as shown in FIG. 15. A prescribed number of terminals (not shown) connecting the terminals 79 of the plate 78 upon downward movement of the printer unit to the printing position are formed on the lower surface of the plate 80.

One battery terminal 81 between the terminals 81 and 82 connecting the electrodes of the battery 38 is directly connected to the plate 80 at the printer unit side. The terminal 82 is connected to the plate 80 through lead wires 83. The plate 80 is also connected to the head 36 through lead wires 84.

Reference numeral 85 in FIG. 1 denotes a controller housed in the front portion of the housing 11. The controller 85 stores the data read by the reader unit, and the storage data is supplied to the printer unit during printing. The controller 85 is connected through lead wires (to be described later) to the illuminating element 30 and the image sensor 31 constituting the reader unit, to the plate 78 at the upper end of the case connected to the printer unit, and to the elements 71 and 72.

Referring to FIGS. 6 and 10, reference numerals 86 and 87 denote lead wires connected to the element 30 and the sensor 31; and 88, a lead wire connected to the plate 78 at the upper end of the case 16. The wires 86, 87 and 88 are inserted from the case 16 in the hollow shaft 66 and are bundled as a single cord 89. The cord 89 extends outside the case 16. Referring to FIG. 6, reference numerals 90 and 91 denote lead wires connected to the timing pulse generating elements 71 and 72. The lead wires 90 and 91 are bundled to the cord 89 extending outside the case 16. The cord 89 comprises a coil cord which can be extended, as shown in FIG. 5. The cord 89 is guided along the rack 67 and is connected to the controller 85.

A method of using the handy reader/printer apparatus having the arrangement described above will be described hereinafter.

The handy reader/printer apparatus can be carried while the carrier case 16 is fitted in the space 12 in the housing 11, as indicated by the solid lines of FIG. 2. In this case, the case 16 is fitted in the space 12 while the printer unit is moved downward to the printing position.

When the reader/printer apparatus is used, the case 16 is raised as indicated by the alternate long and two dashed lines of FIG. 2, and the power switch 15 is turned on.

When recorded information is to be read from the reading medium, the user depresses the lever 59 to move the printer unit upward to the position shown in FIG. 1, and the plate 78 of the case 16 is separated from the plate 80 of the printer unit to disconnect the controller 85 from the printer unit. In this state, the reader/printer apparatus is set in the reader mode. When the printer unit is set in the reader mode, the elements 30 and 71 are turned on.

Figure 19:
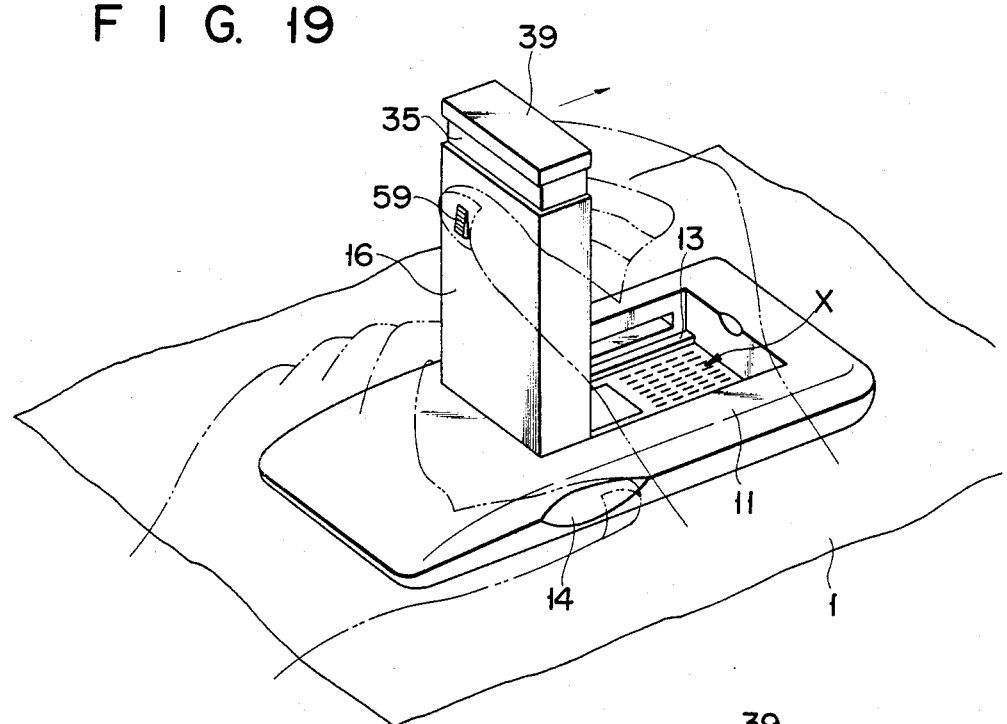
FIGS. 19 and 20 are perspective views showing the read states of the reader/printer apparatus, respectively.

After the reader/printer apparatus is set in the reader mode, as shown in FIG. 19, the user places the housing 11 of the reader/printer apparatus on the reading medium (e.g., a book, a newspaper or other printed matter) 1 such that the desired portion having information X to be read falls within the opening 13 in the lower surface of the housing 11. The user holds the housing 11 with one hand (e.g. the left hand) and the case 16 with the other hand (e.g., the right hand) and moves it to the rear end side of the housing 11. In the reader mode, the user continuously pushes the lever 59 to lock the printer unit in the upper position.

When the user moves the case 16 in the manner described above, the reader unit scans the medium 1 upon movement of the case 16. The data read by the sensor 31 is transferred to the controller 85.

Upon movement of the case 16, the disk 69 is rotated to generate the timing pulses corresponding to the moving speed of the case 16 and generated from the element 72. The timing pulses are also supplied to the controller 85. The read data is stored in the controller 85 in synchronism with the timing pulses.

Figure 20:
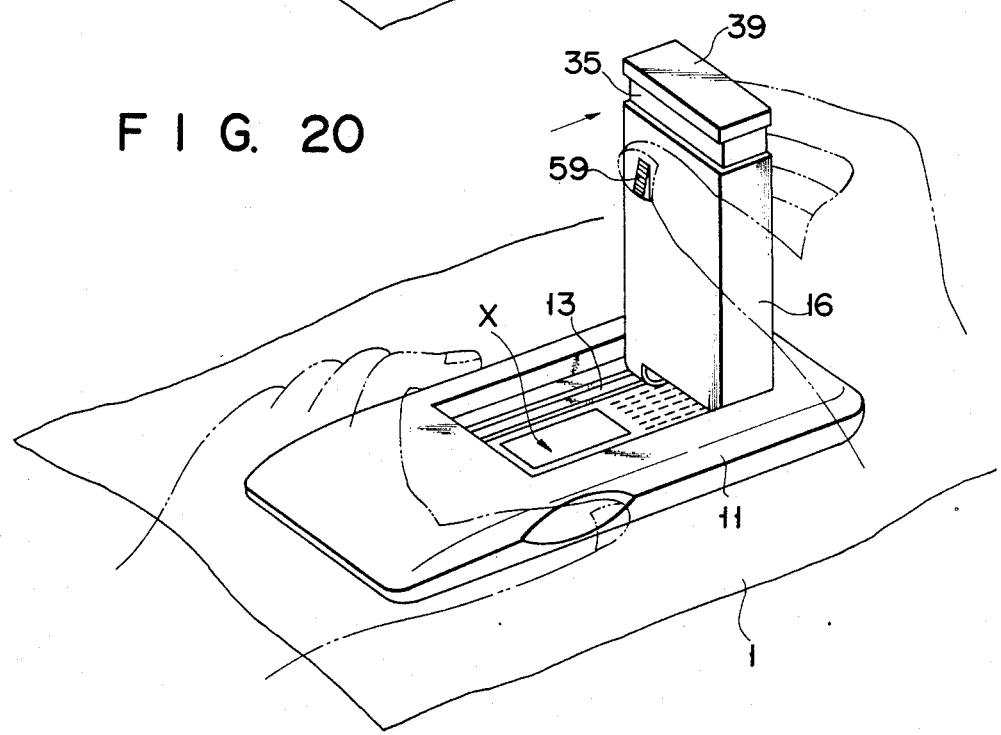

FIG. 20 shows a state wherein the case 16 is moved to its limit. When the case 16 is moved to the limit, one scanning is completed.

After information of the desired portion of the medium 1 is scanned, the case 16 is returned to the initial position. While the case 16 is returned to the initial position, the elements 30 and 71 are turned off, and no reading is performed.

When data read from the reading medium is to be printed, the user releases the finger from the lever 59 to set the printer unit in the printing position, so that the plate 78 of the case 16 is brought into contact with the plate 80 of the printer unit and that the gear 43 of the printer unit is meshed with the uppermost one of the power transmission gears of the case 16.

When the printer unit is electrically connected to the controller 85, the reader/printer apparatus is set in the printer mode. In the printer mode, only the element 71 is turned on.

Figure 21:
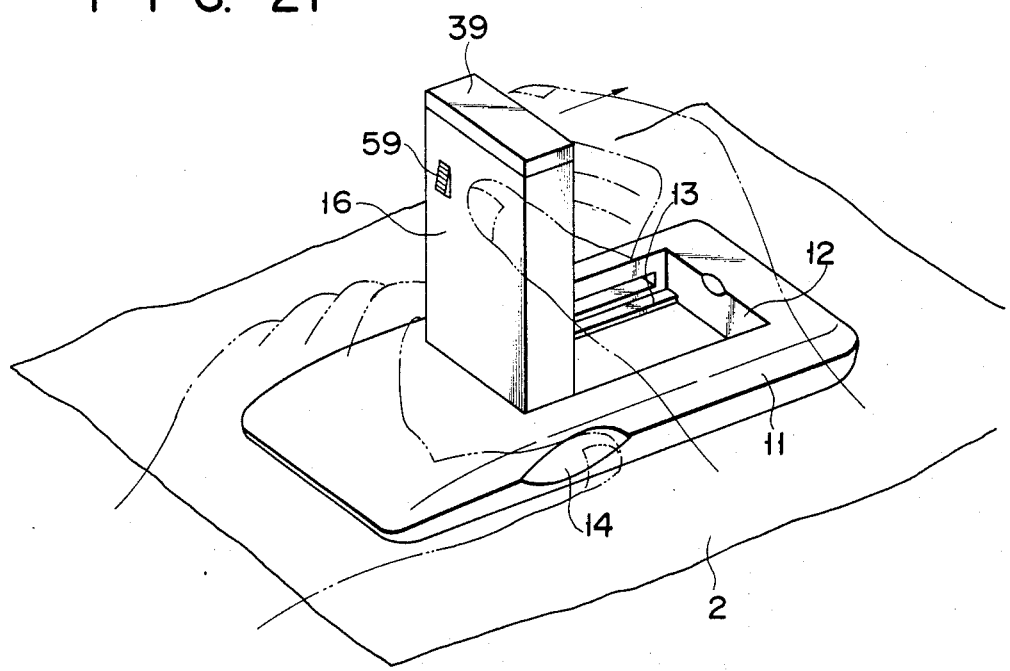
FIGS. 21 and 22 are perspective views showing the printing states of the apparatus of FIGS. 1 and 2.

Since the reader/printer apparatus is set in the printer mode, as shown in FIG. 21, the user places the housing 11 on the medium (e.g., a notebook and printing paper) 2 such that the desired portion, for printing the read data X, falls within the opening 13 in the lower surface of the housing 11. In this case, since the printer unit is moved downward to the printing position, the head 36 is brought into contact with the medium 2 through the tape 51 when the housing 11 is placed on the medium 2.

Thereafter, the user holds the housing 11 with the left hand and the case 16 with the right hand, and moves the case 16 toward the rear end of the housing 11 in the same manner as in the reader mode. Note that the user must not depress the lever 59.

When the case 16 is thus moved, the printer unit tracks the desired portion of the medium 2 and the element 72 generates timing pulses corresponding to the moving speed of the case 16.

When the timing pulses are supplied to the controller 85, the controller 85 supplies the storage data to the printer unit, thereby driving the printhead 36 in the printer unit. Upon movement of the case 16, the reel 52 in the printer unit is rotated, so that the ink tape 51 is fed in synchronism with printing.

Figure 22:
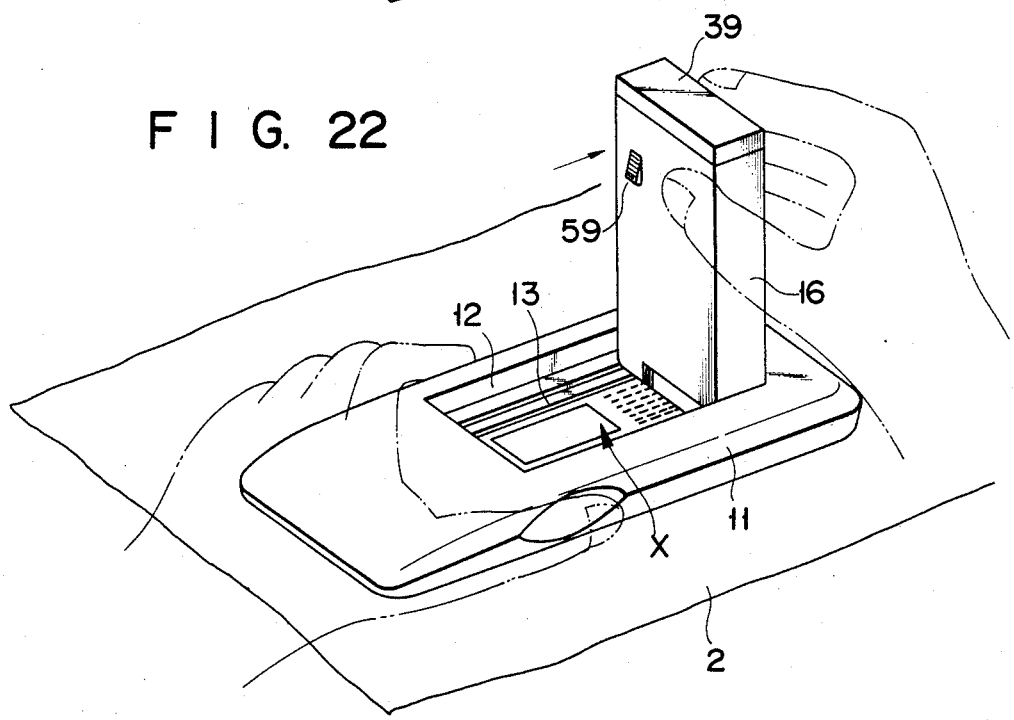

As described above, the data is read out from the controller 85 and is printed on the printing medium 2 while the case 16 is being moved. As shown in FIG. 22, when the case 16 is moved to its limit, all the information X has been printed on the printing medium 2.

Figure 23:
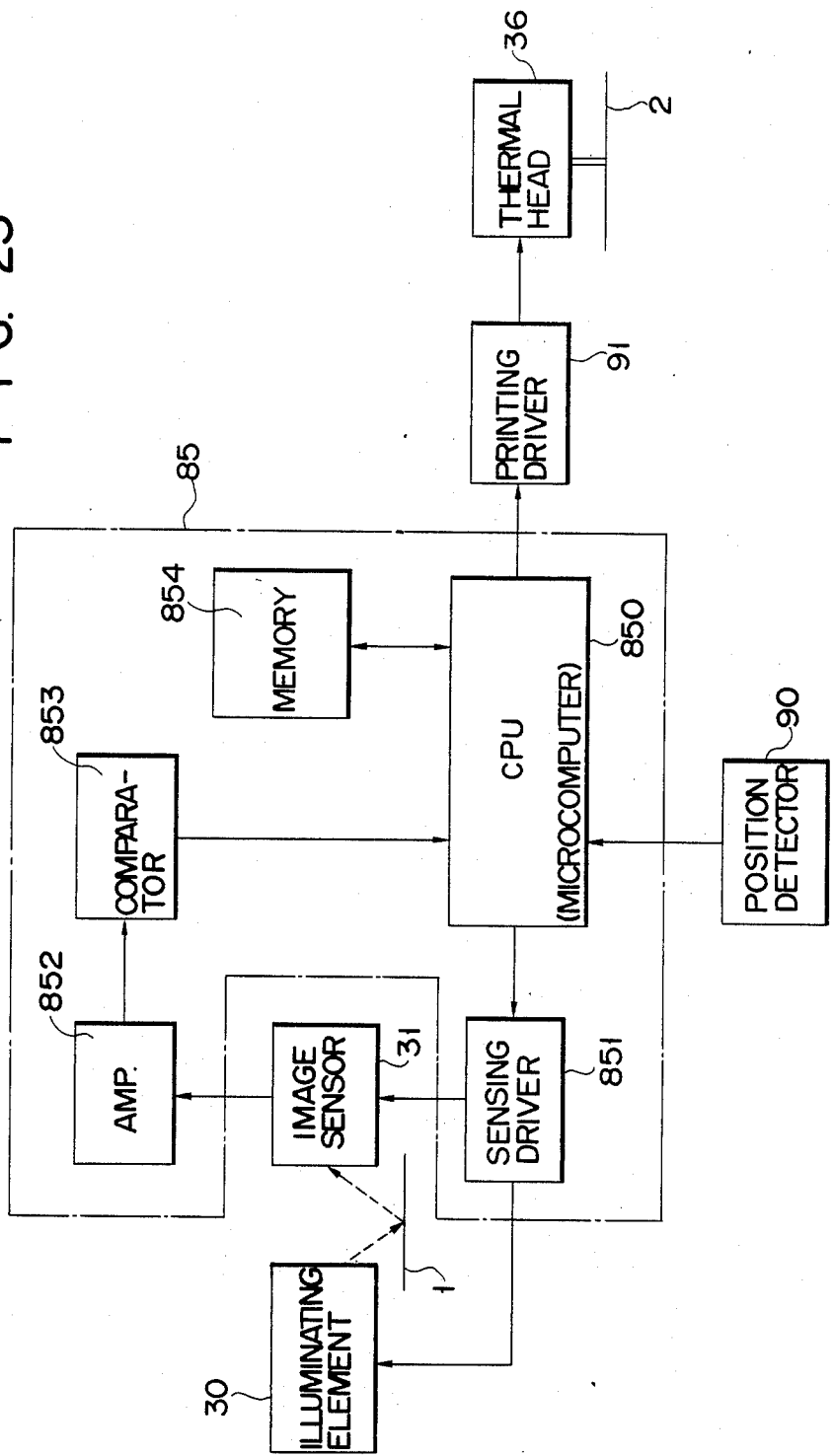
FIG. 23 is a block diagram showing the schematic arrangement of a controller used in the apparatus of FIGS. 1 and 2.

FIG. 23 is a block diagram showing the schematic arrangement of the controller 85. Reference numeral 850 denotes a microcomputer (CPU) for performing system control. In the reader mode, a sensing driver 851 generates a drive signal for driving the element 30 and the sensor 31 in response to a control signal from the CPU 850. The element 30 emits light onto the medium 1, and light reflected from the medium 1 is received by the sensor 31. The sensor 31 converts a light density signal to a corresponding electrical signal. The electrical signal is amplified by an amplifier 852, and the amplified signal is supplied to a comparator 853. The comparator 853 converts the analog signal to binary image data. The image data is stored in an image memory 854 through the CPU 850. The write timing is controlled in response to a position detection signal from a position detector 90 for detecting a read position in response to the timing pulses from the element 72.

In the printer mode, the image data is read out from the image memory 854 and supplied to a printing driver 91 through the CPU 850. The image data is printed on the medium 2 through the head 36. The read access timing is controlled in response to a position detection signal from the position detector 90 for detecting the printing position in response to timing pulses from the element 72.

When a read region in the medium 1 is excessively wide so as to not allow a single reading cycle, or when a plurality of read regions are spaced apart from each other, reading of the medium 1 and printing of the medium 2 are alternately repeated. When the controller 85 has a large memory capacity, all information from the desired regions is read and can be printed on the printer (in this case, the read cycles are more than the printing cycles).

In the handy reader/printer apparatus described above, recorded information X of the desired portion on the medium 1 is read, and the read information X is printed on the desired portion of the medium 2. According to this handy reader/printer apparatus, only the required information can be printed without physically cutting the required information portion from the medium.

The handy reader/printer apparatus has a variety of applications represented as follows:

(a) Only desired portions are extracted from newspapers or the like and recorded on a notebook to provide a scrapbook.

(b) When an identical figure is drawn in a plurality of locations, only one figure need be read in one location and then can be copied to other locations.

(c) A mark or the like in a catalog can be copied as a decorative pattern for personal use.

The handy reader/printer apparatus has the opening in the lower surface of the housing 11, and the desired portion of the reading or printing medium is set to fall within the opening 13. The case 16 is moved from one end to the other end of the opening 13. The apparatus has the reader unit for scanning a desired portion of the medium to be read and reading the recorded information upon movement of the case 16, and the printer unit arranged in the case 16 to scan the desired portion of the medium to be printed to print the read information on the medium upon movement of the case 16. The handy reader/printer apparatus performs reading while the housing thereof is placed on the reading medium and printing while the housing is placed on the printing medium. Information can be read from three-dimensional objects such as books and printed on three-dimensional objects such as notebooks without using a platen, thereby achieving a compact apparatus.

In the above embodiment, the case 16 can be laid down and fitted in the housing 11. The case 16 need not be fitted in the housing 11. In the above embodiment, the case 16 is manually moved. However, the carrier case 16 may be automatically fed by using a belt conveyor mechanism or a screw feed mechanism. In this case, the carrier need not be a case-like housing. A transparent cover may be formed on the upper portion of the housing defining the space 12.

Furthermore, in the above embodiment, width of the reader and printer units is about 4 cm. However, the width may be larger than or smaller than 4 cm. Furthermore, the moving stroke, i.e., reading and printing length of the carrier can be arbitrarily determined.

In the handy reader/printer apparatus according to the present invention, the housing is selectively placed on desired portions of the reading and printing media to perform reading and printing. According to the present invention, information can be read from a three-dimensional object such as a book and can be printed on a three-dimensional object such as a notebook. In addition, the platen is not required, so that the apparatus as a whole can be made compact and portable.

What is claimed is:

1. A handy reader/printer apparatus for reading recorded information from a desired portion of a medium to be read and printing read information in a desired portion of a medium to be printed, said apparatus comprising:
    a housing having an opening in a lower surface thereof and placed on the medium to be read or printed such that the desired portion of the medium can be fitted in the opening;
    a reader unit, arranged in said housing, for reading the recorded information of the desired portion of the medium to be read fitted in the opening while said housing is placed on the medium;
    a printer unit, arranged in said housing, for printing data, previously read, in the desired portion of the medium to be printed, fitted in the opening while the housing is placed on the medium;
    a memory for storing data read by said reader unit upon operation of said reader unit; and
    a readout unit for reading out the storage data from said memory and supplying the readout data as the printing data to said printer unit upon operation of said printer unit.

2. An apparatus according to claim 1, further comprising a carrier linearly movable between one end and the other end of the opening with respect to said housing, said carrier being adapted to support said reader unit and said printer unit.

3. An apparatus according to claim 2, wherein said carrier can be pivoted to stand on said housing or to lay down in accordance with a use or nonuse state.

4. An apparatus according to claim 3, wherein said carrier can be layed down and fitted in said housing during use of said apparatus.

5. An apparatus according to claim 3, wherein said carrier stands on said housing to be substantially perpendicular to a surface of said housing during use of said apparatus.

6. An apparatus according to claim 5, wherein said carrier has two pairs of vertical rollers which are in rolling contact with two front positions and two rear positions of two inner bottom surfaces defining said opening of said housing while said carrier is perpendicular to the surface of said housing.

7. An apparatus according to claim 6, wherein said carrier has two pairs of horizontal rollers which are in rolling contact with two inner side surfaces continuous with said two inner bottom surfaces of said housing in the same positional relationship as in said two pairs of vertical rollers.

8. An apparatus according to claim 2, wherein said reader unit is arranged obliquely opposite to said opening of said housing near a proximal portion of said carrier and includes a line illumination element for emitting a linear beam to the desired portion of said medium to be read in a direction perpendicular to a moving direction of said carrier and a line image sensor for receiving light reflected by the desired portion of said medium to be read and converting a reflected light component into an electrical signal.

9. An apparatus according to claim 2, wherein said printer unit is slidable with respect to said carrier between a first position where said printer unit is separated from said opening of said housing during reading and a second position where said printer unit falls within said opening of said housing during printing.

10. An apparatus according to claim 9, wherein said printer unit includes: a printer housing having at least a line thermal printhead opposite perpendicularly to said opening of said housing near a proximal portion of said carrier and opposite linearly to a direction perpendicular to the moving direction of said carrier; and an ink tape cassette loaded in said printer housing.

11. An apparatus according to claim 9, wherein said printer unit has an operation member depressed upon reading by said reader unit and a lock mechanism interlocked with depression of said operation member to lock said printer unit in the first position.

12. An apparatus according to claim 10, wherein said ink tape cassette includes a pair of tape guide members opposite at two sides of said thermal head, a thermal transfer ink tape looped between distal ends of said pair of tape guide members, a tape reel for supplying the ink tape and a tape take-up reel for winding the ink tape supplied from said tape reel, said reel being interlocked with said carrier during printing.

13. An apparatus according to claim 2, further comprising means for generating a timing signal corresponding to a moving speed of said carrier, the timing signal being adapted to control a write timing of said memory and a read timing of said readout means.

* * * * *